(12) United States Patent
Xiao et al.

(10) Patent No.: US 8,704,500 B2
(45) Date of Patent: Apr. 22, 2014

(54) SENSING A PHASE-PATH CURRENT IN A MULTIPHASE POWER SUPPLY SUCH AS A COUPLED-INDUCTOR POWER SUPPLY

(75) Inventors: Shangyang Xiao, Milpitas, CA (US); Weihong Qiu, San Jose, CA (US); Jun Liu, San Jose, CA (US)

(73) Assignee: Intersil Americas LLC, Milpitas, CA (US)

( * ) Notice: Subject to any disclaimer, the term of this patent is extended or adjusted under 35 U.S.C. 154(b) by 851 days.

(21) Appl. No.: 12/189,112

(22) Filed: Aug. 8, 2008

(65) Prior Publication Data
US 2009/0045785 A1 Feb. 19, 2009

Related U.S. Application Data (60) Provisional application No. 60/964,792, filed on Aug. 14, 2007, provisional application No. 61/072,287, filed on Mar. 27, 2008.

(51) Int. Cl.
*G05F 1/00* (2006.01)
(52) U.S. Cl.
USPC .......................................... 323/272; 323/290
(58) Field of Classification Search
USPC ......... 323/214, 222, 224, 268, 271, 272, 277, 323/282, 285, 290
See application file for complete search history.

(56) References Cited

U.S. PATENT DOCUMENTS

| 4,000,509 A | 12/1976 | Jarvela |
|---|---|---|
| 4,088,942 A | 5/1978 | Miko |
| 4,631,471 A | 12/1986 | Fouad et al. |
| 4,710,798 A | 12/1987 | Marcantonio |
| 5,204,809 A | 4/1993 | Andresen |
| 5,414,401 A | 5/1995 | Roshen et al. |
| 5,631,822 A | 5/1997 | Sliberkleit et al. |
| 5,764,500 A | 6/1998 | Matos |

(Continued)

FOREIGN PATENT DOCUMENTS

| JP | 56023725 | 3/1981 |
|---|---|---|
| WO | 2006/026674 | 3/2006 |

OTHER PUBLICATIONS

Xiao et al. (2009) "Parasitic Resistance Current Sensing Topology for Coupled Inductors" pp. 14.

(Continued)

*Primary Examiner* — Adolf Berhane
*Assistant Examiner* — Emily P Pham
(74) *Attorney, Agent, or Firm* — Paul A. Bernkopf; Graybeal Jackson LLP; Bryan A. Santarelli (57) ABSTRACT

An embodiment of a power supply includes a supply output node, phase paths, and sensor circuits. The supply output node is operable to carry a regulated output voltage, and each phase path has a respective phase-path non-output node, has a respective phase-path output node coupled to the supply output node, and is operable to carry a respective phase current. And each sensor circuit has a respective sensor node coupled to the phase-path non-output nodes and is operable to generate a respective sense signal that represents the phase current flowing through a respective one of the phase paths. For example, where the phase paths are magnetically coupled to one another, the sensor circuits take into account the portions of the phase currents induced by the magnetic couplings to generate sense signals that more accurately represent the phase currents as compared to conventional sensor circuits.

29 Claims, 6 Drawing Sheets

(56) References Cited

U.S. PATENT DOCUMENTS

| | | | |
|---|---|---|---|
| 5,790,005 A | 8/1998 | Santi et al. |
| 5,889,373 A | 3/1999 | Fisher et al. |
| 5,929,692 A | 7/1999 | Carsten |
| 5,982,160 A | 11/1999 | Walters et al. |
| 6,018,468 A | 1/2000 | Archer et al. |
| 6,144,194 A | 11/2000 | Varga |
| 6,239,510 B1 | 5/2001 | Azimi et al. |
| 6,271,650 B1 | 8/2001 | Massie et al. |
| 6,272,023 B1 | 8/2001 | Wittenbreder |
| 6,278,263 B1 | 8/2001 | Walters et al. |
| 6,362,986 B1 | 3/2002 | Schultz et al. |
| 6,417,753 B1 | 7/2002 | Wolf et al. |
| 6,549,436 B1 | 4/2003 | Sun |
| 6,686,727 B2 | 2/2004 | Ledenev et al. |
| 6,696,823 B2 | 2/2004 | Ledenev et al. |
| 6,765,468 B2 | 7/2004 | Chen et al. |
| 6,822,875 B2 | 11/2004 | Chan et al. |
| 6,856,230 B2 | 2/2005 | Lu |
| 6,873,237 B2 | 3/2005 | Chandrasekaran et al. |
| 6,885,274 B2 | 4/2005 | Hsu et al. |
| 6,980,077 B1 | 12/2005 | Chandrasekaran et al. |
| 6,995,548 B2 | 2/2006 | Walters et al. |
| 7,002,325 B2 | 2/2006 | Harris et al. |
| 7,005,835 B2 | 2/2006 | Brooks et al. |
| 7,026,798 B2 * | 4/2006 | Cheung et al. ............... 323/225 |
| 7,046,523 B2 | 5/2006 | Sun et al. |
| 7,109,691 B2 | 9/2006 | Brooks et al. |
| 7,136,293 B2 | 11/2006 | Petkov et al. |
| 7,233,132 B1 * | 6/2007 | Dong et al. .................. 323/272 |
| 7,242,172 B2 | 7/2007 | Carlson et al. |
| 7,301,314 B2 | 11/2007 | Schuellein et al. |
| 7,327,128 B2 | 2/2008 | Dinh |
| 7,352,269 B2 | 4/2008 | Li et al. |
| 7,358,710 B2 * | 4/2008 | Luo et al. .................... 323/282 |
| 7,365,518 B2 * | 4/2008 | Wiseman ..................... 322/28 |
| 7,394,233 B1 | 7/2008 | Trayling et al. |
| 7,449,867 B2 | 11/2008 | Wu et al. |
| 7,456,618 B2 | 11/2008 | Jain et al. |
| 7,468,899 B1 | 12/2008 | Hopper et al. |
| 7,508,182 B1 * | 3/2009 | Chang ......................... 323/282 |
| 7,514,909 B2 | 4/2009 | Burstein et al. |
| 7,567,163 B2 | 7/2009 | Dadafshar et al. |
| 7,782,031 B2 | 8/2010 | Qiu et al. |
| 7,808,355 B2 | 10/2010 | Nagano et al. |
| 2003/0197585 A1 | 10/2003 | Chandrasekaran et al. |
| 2003/0198067 A1 | 10/2003 | Sun et al. |
| 2004/0051616 A1 | 3/2004 | Kiko et al. |
| 2004/0113741 A1 | 6/2004 | Li et al. |
| 2004/0140877 A1 | 7/2004 | Nakao et al. |
| 2004/0160298 A1 | 8/2004 | Hsu et al. |
| 2004/0178473 A1 | 9/2004 | Dentry et al. |
| 2004/0239470 A1 | 12/2004 | Lu |
| 2005/0024179 A1 | 2/2005 | Chandrasekaran et al. |
| 2005/0024838 A1 | 2/2005 | Maxwell |
| 2005/0151614 A1 | 7/2005 | Dadafshar |
| 2005/0174208 A1 | 8/2005 | Sato et al. |
| 2005/0286270 A1 | 12/2005 | Petkov et al. |
| 2006/0038549 A1 | 2/2006 | Mehrotra et al. |
| 2006/0038650 A1 | 2/2006 | Mehrotra et al. |
| 2006/0145800 A1 | 7/2006 | Dadafshar et al. |
| 2006/0187684 A1 | 8/2006 | Chandrasekaran et al. |
| 2006/0197510 A1 | 9/2006 | Chandrasekaran |
| 2006/0250205 A1 | 11/2006 | De et al. |
| 2007/0258213 A1 | 11/2007 | Chen et al. |
| 2007/0273349 A1 | 11/2007 | Wei et al. |
| 2007/0285200 A1 | 12/2007 | Hsieh |
| 2008/0067990 A1 | 3/2008 | Wei |
| 2008/0303495 A1 | 12/2008 | Wei et al. |
| 2008/0309299 A1 | 12/2008 | Wei et al. |
| 2008/0315982 A1 | 12/2008 | Wei et al. |
| 2009/0059546 A1 | 3/2009 | Xing |
| 2009/0108821 A1 * | 4/2009 | Standing ..................... 323/272 |

OTHER PUBLICATIONS

Czogalla (2003) "Automotive Application of Multi-Phase Coupled-Inductor DC-DC Converter" IAS Conference, Oct. 12-16, 3:1524-1529.

Dixon (1993) "Coupled Inductor Design", Unitrode Seminar, May 1993, Topic 8.

Finn (2004) "Applications and Equivalent Models for Coupled Inductor Parallel Interleaved Converters", AUPEC 2004, Brisbane, Australia, Sep. 26-29.

Li (2002) "Coupled-Inductor Design Optimization for Fast-Response Low-Voltage DC-DC Converters", IEEE APEC, Mar. 10-14, Dallas, Texas, 2:817-823.

Maksimovic (1998) "Modeling of Cross-Regulation in Converters Containing Coupled Inductors", IEEE APEC, Feb. 15-19, Anaheim, California, 1:350-356.

Park (1997) "Modeling and Analysis of Multi-Interphase Transformers for Connecting Power Converters in Parallel", IEEE PSEC, Jun. 22-27, St. Louis, Missouri, 2:1164-1170.

Wong (2000) "Investigating Coupling Inductors in the Interleaving QSW VRM", IEEE APEC, Feb. 6-10, New Orleans, Louisiana, 2:973-978.

Wu (2006) "Multi-Phase Buck Converter Design with Two-Phase Coupled Inductors", IEEE APEC, Mar. 19-23.

Xu (1996) "Analysis by Finite Element Method of a Coupled Inductor Circuit Used as Current Injection Interface", IEEE Workshop on Computers in Power Electronics, Aug. 11-14, Portland, Oregon.

Jieli Li, et al., "Using Coupled Inductors to Enhance Transient Performance of Multi-Phase Buck Converters", 2004 IEEE, pp. 1289-1293.

Anderson F. Hoke, et al., "An Improved Two-Dimensional Numerical Modeling Method for E-Core Transformers", Thayer School of Engineering, Found in IEEE Applied Power Electronics Conference, Mar. 2002, pp. 7.

* cited by examiner

SENSING A PHASE-PATH CURRENT IN A MULTIPHASE POWER SUPPLY SUCH AS A COUPLED-INDUCTOR POWER SUPPLY

CLAIM OF PRIORITY

This application claims priority to U.S. Provisional Application Ser. No. 60/964,792 filed on Aug. 14, 2007 and U.S. Provisional Application Ser. No. 61/072,287 filed on Mar. 27, 2008, which are incorporated by reference.

SUMMARY

An embodiment of a power supply includes a supply output node, phase paths, and sensor circuits. The supply output node is operable to provide a regulated output voltage, and each phase path has a respective phase-path non-output node, has a respective phase-path output node coupled to the supply output node, and is operable to carry a respective phase-path current. And each sensor circuit has a respective sensor node coupled to the phase-path non-output nodes and is operable to generate a respective sense signal that represents the phase current flowing through a respective one of the phase paths.

For example, where the phase paths are magnetically coupled to one another (e.g., the phase paths include magnetically coupled windings), the sensor circuits are able to account for the portions of the phase currents induced by the magnetic couplings between phase paths, and this accounting allows the sensor circuits to generate sense signals that more accurately represent the phase currents as compared to conventional sensor circuits. The sense signals may be fed back to the power-supply controller, which regulates the output voltage at least partly in response to the fed-back sense signals.

DETAILED DESCRIPTION

Figure 1:
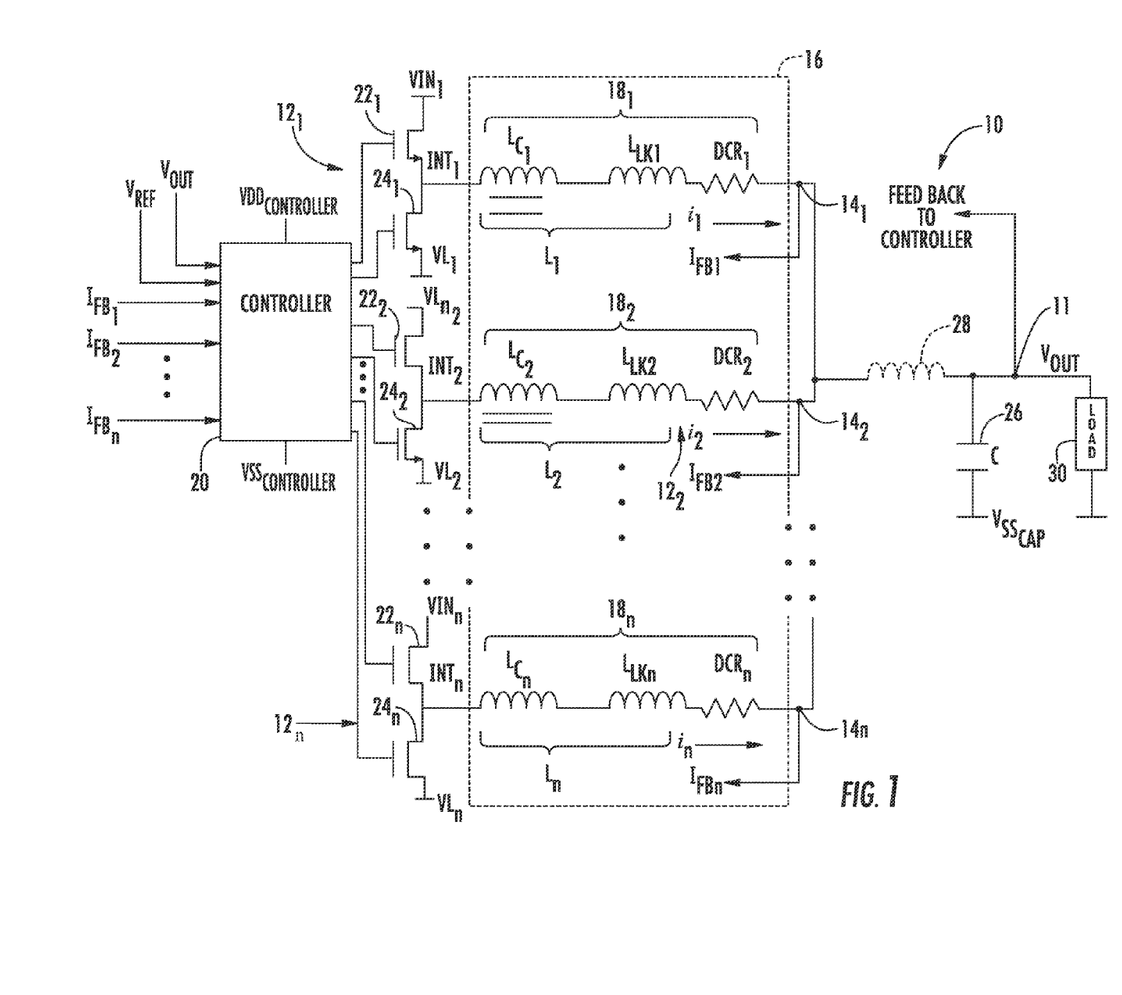
FIG. 1 is a schematic diagram of an embodiment of a coupled-inductor multiphase power supply that includes sense circuits for sensing the phase currents.

FIG. 1 is a schematic diagram of an embodiment of a coupled-inductor (CI) multiphase power supply 10, here a CI buck converter, which provides a regulated output voltage $V_{out}$ at a supply output node 11, and which includes phase paths (alternatively "phases") $12_1$-$12_n$ and current sensors $14_1$-$14_n$ for respectively sensing the currents $i_1$-$i_n$ through the phases. As discussed below in conjunction with FIGS. 2-5, the current sensors $14_1$-$14_n$ may each be coupled to respective multiple phase paths $12_1$-$12_n$ at nodes or locations other than the supply output node 11. For example, assume that some or all of the phases $12_1$-$12_n$ are magnetically coupled to one another. Coupling a current sensor 14 not only to a first phase 12 for which the sensor measures the phase current, but also to one or more second phases 12 to which the first phase is magnetically coupled, may allow the sensor to sense the current through the first phase more accurately than some conventional current sensors can.

The current sensors $14_1$-$14_n$ respectively generate sense signals $I_{FB1}$-$I_{FBn}$, which respectively represent the phase currents $i_1$-$i_n$. For example, each of the signals $I_{FB1}$-$I_{FBn}$ may be a respective voltage that has substantially the same signal phase as the corresponding phase current i and that has an amplitude that is substantially proportional to the amplitude of the corresponding phase current.

In addition to the current sensors $14_1$-$14_n$, the converter 10 includes a coupled-inductor assembly 16 having windings $18_1$-$18_n$, which are wound about a common core (not shown in FIG. 1) and which are magnetically coupled to one another via the core, a power-supply controller 20, high-side drive transistors $22_1$-$22_n$, low-side drive transistors $24_1$-$24_n$, a filter capacitor 26, and an optional filter inductor 28. A winding 18 and the high-side and low-side transistors 22 and 24 coupled to the winding at a phase intermediate node INT compose a respective phase 12. For example, the winding $18_1$ and the transistors $22_1$ and $24_1$ compose the phase $12_1$.

The controller 20 may be any type of controller suitable for use in a multiphase CI power supply, is supplied by voltages $VDD_{controller}$ and $VSS_{controller}$, and receives the regulated output voltage $V_{out}$, a reference voltage $V_{ref}$, and the sense signals $I_{FB1}$-$I_{FBn}$, which are fed back to the controller from the current sensors $14_1$-$14_n$, respectively. The controller 20 may use $V_{ref}$ and the fed back $V_{out}$ and $I_{FB1}$-$I_{FBn}$ to conventionally regulate $V_{out}$ to a desired value.

The high-side transistors $22_1$-$22_n$, which are each switched "on" and "off" by the controller 20, are power NMOS transistors that are respectively coupled between input voltages $VIN_1$-$VIN_n$ and the nodes $INT_1$-$INT_n$. Alternatively, the transistors $22_1$-$22_n$ may be other than power NMOS transistors, and may be coupled to a common input voltage. Moreover, the transistors $22_1$-$22_n$ may be integrated on the same die as the controller 20, may be integrated on a same die that is separate from the die on which the controller is integrated, or may be discrete components.

Similarly, the low-side transistors $24_1$-$24_n$, which are each switched on and off by the controller 20, are power NMOS transistors that are respectively coupled between low-side voltages $VL_1$-$VL_n$ and the nodes $INT_1$-$INT_n$ of the phase windings $18_1$-$18_n$. Alternatively, the transistors $24_1$-$24_n$ may be other than power NMOS transistors, and may be coupled to a common low-side voltage such as ground. Moreover, the transistors $24_1$-$24_n$ may be integrated on the same die as the controller 20, may be integrated on a same die that is separate from the die on which the controller is integrated, may be integrated on a same die as the high-side transistors $22_1$-$22_n$, may be integrated on respective dies with the corresponding high-side transistors $22_1$-$22_n$ (e.g., transistors $22_1$ and $24_1$ on a first die, transistors $22_2$ and $24_2$ on a second die, and so on), or may be discrete components.

The filter capacitor 26 is coupled between the regulated output voltage $V_{out}$ and a voltage $VSS_{cap}$, and works in concert with the windings $18_1$-$18_n$ and an optional filter inductor 28 (if present) to maintain the amplitude of the steady-state ripple-voltage component of $V_{out}$ within a desired range which may be on the order of hundreds of microvolts (μV) to tens of millivolts (mV). Although only one filter capacitor 26 is shown, the converter 10 may include multiple filter capacitors coupled in electrical parallel. Furthermore, $VSS_{cap}$ may be equal to $VSS_{controller}$ and to $VL_1$-$VL_n$; for example, all of these voltages may equal ground.

As further discussed below, the filter inductor 28 may be omitted if the leakage inductances $L_{lk1}$-$L_{lkn}$ (discussed below) of the windings $18_1$-$18_n$ are sufficient to perform the desired inductive filtering function. In some applications, the filter inductor 28 may be omitted to reduce the size and component count of the converter 10.

Each of the windings $18_1$-$18_n$ of the coupled-inductor assembly 16 may be modeled as a self inductance L and a resistance DCR. For purposes of discussion, only the model components of the winding $18_1$ are discussed, it being understood that the model components of the other windings $18_2$-$18_n$ are similar, except for possibly their values.

The self inductance $L_1$ of the winding $18_1$ may be modeled as two zero-resistance inductances: a magnetic-coupling inductance $L_{C1}$, and a leakage inductance $L_{lk1}$. When a phase current $i_1$ flows through the winding $18_1$, the current generates a magnetic flux. The value of the coupling inductance $L_{C1}$ is proportional to the amount of this flux that is coupled to other windings $18_2$-$18_n$, and the value of the leakage inductance $L_{lk1}$ is proportional to the amount of the remaining flux, which is not coupled to the other windings $18_2$-$18_n$. In one embodiment, $L_{C1}=L_{C2}=\ldots=L_{Cn}$, and $L_{lk1}=L_{lk2}=\ldots=L_{lkn}$, although inequality among the coupling inductances $L_C$, the leakage inductances $L_{lk}$, or both $L_C$ and $L_{lk}$, is contemplated. Furthermore, in an embodiment, the respective magnetic-coupling coefficients between pairs of coupling inductances $L_c$ are equal (i.e., a current through $L_{C1}$ magnetically induces respective equal currents in $L_{C2}, \ldots L_{Cn}$), although unequal coupling coefficients are contemplated.

The resistance $DCR_1$ is the resistance of the winding $18_1$ when a constant voltage $V_1$ is applied across the winding and causes a constant current $I_1$ to flow through the winding. That is, $DCR_1=V_1/I_1$.

The power supply 10 may provide the regulated voltage $V_{out}$ to a load 30, such as a microprocessor.

Still referring to FIG. 1, alternate embodiments of the power supply 10 are contemplated. Some or all of the phases $12_1$-$12_n$ may be magnetically uncoupled from one another. For example, phases $12_1$ and $12_2$ may be formed on a first core and thus may be magnetically coupled, and phases $12_3$ and $12_4$ may be formed on a second core separate from the first core, and thus may be magnetically coupled to one another but magnetically uncoupled form the phases $12_1$ and $12_2$. Or, a phase 12 may be magnetically uncoupled from all other phases 12. Furthermore, although described as a multiphase buck converter, the power supply 10 may be any other type of multiphase power supply.

Figure 2:
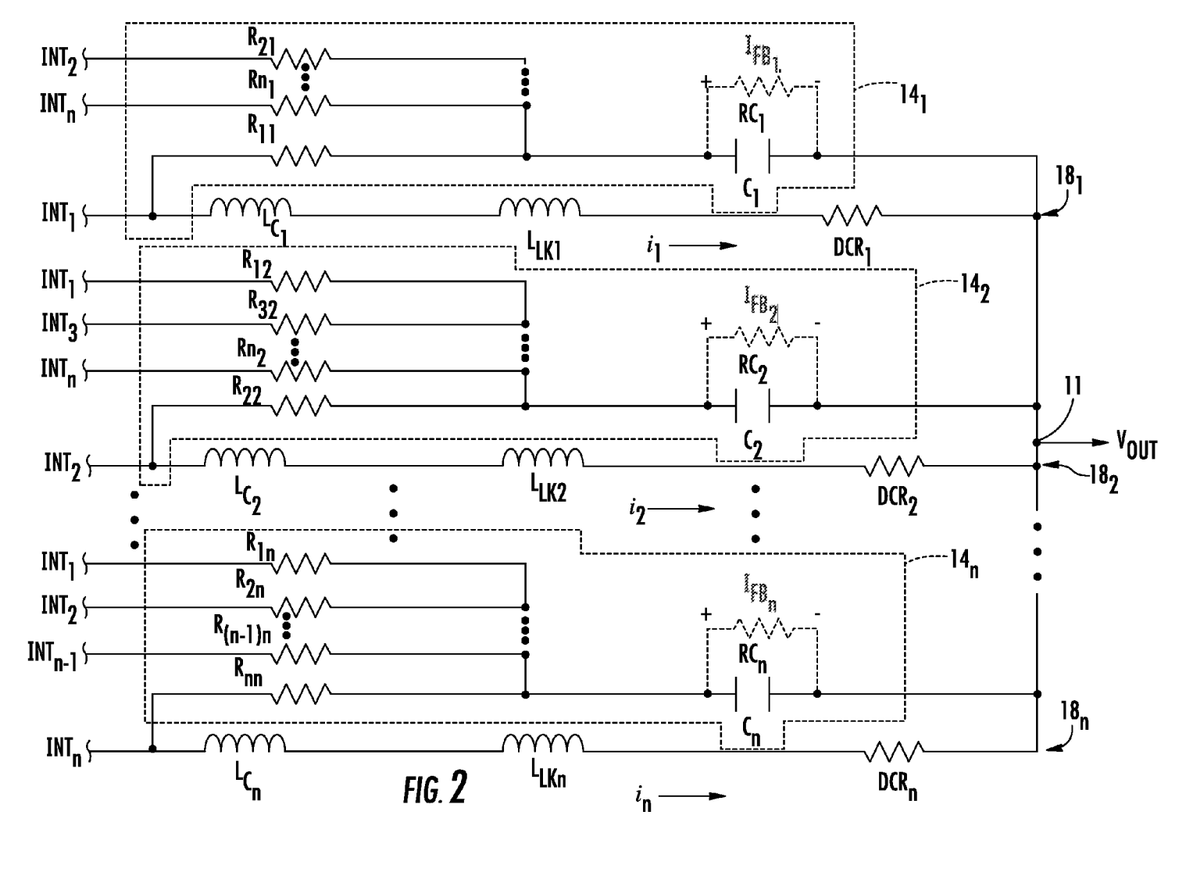
FIG. 2 is a schematic diagram of a portion of the power supply of FIG. 1 including the phase-path windings, and an embodiment of the sensor circuits of FIG. 1.

FIG. 2 is a schematic diagram of a portion of the power supply 10 of FIG. 1 including the windings $18_1$-$18_n$ and an embodiment of the current sensors $14_1$-$14_n$. For purposes of discussion, it is assumed that all of the windings $18_1$ and $18_n$ are magnetically coupled to one another, and that the filter inductor 28 is omitted from the supply 10. For brevity, only the sensor $14_1$ is discussed, it being understood that the other sensors 14 are similar except for possibly the values of the components that compose the other sensors.

The sensor $14_1$ includes a capacitor $C_1$ across which the sense signal $I_{FB1}$ (here a voltage signal) is generated, an optional scaling resistor $RC_1$ coupled across $C_1$, and resistors $R_{11}$-$R_{n1}$, which are respectively coupled between the nodes $INT_1$-$INT_n$ and $C_1$.

The resistor $R_{11}$ couples to $C_1$ a signal (a current in this embodiment) that represents the portion of the phase current $i_1$ that the switching transistors $22_1$ and $24_1$ (FIG. 1) cause to flow through the winding $18_1$.

And the resistors $R_{21}$-$R_{n1}$ each couple to $C_1$ a respective signal (a current in this embodiment) that represents the respective portion of $i_1$ that a respective phase current $i_2$-$i_n$ magnetically induces in the winding $18_1$. That is, the resistor $R_{21}$ couples to $C_1$ a current that is proportional to the portion of $i_1$ that the phase current $i_2$ magnetically induces in the winding $18_1$. Similarly, the resistor $R_{31}$ couples to $C_1$ a current that is proportional to the portion of $i_1$ that the phase current $i_3$ magnetically induces in the winding $18_1$, and so on.

$C_1$ generates from the sum of the signals from $R_{11}$-$R_{n1}$ the sense voltage $I_{FB1}$, which has the same phase as $i_1$ and which has an amplitude that is proportional to the amplitude of $i_1$.

Therefore, a power-supply controller, such as the controller 20 of FIG. 1, may obtain from $I_{FB1}$ an accurate representation of the instantaneous phase and amplitude of the phase current $i_1$.

In a similar manner, the capacitors $C_2$-$C_n$ respectively generate the sense voltages $I_{FB2}$-$I_{FBn}$, from which a power-supply controller, such as the controller 20 of FIG. 1, may obtain accurate representations of the instantaneous phases and amplitudes of the phase currents $i_2$-$i_n$.

Figure 3:
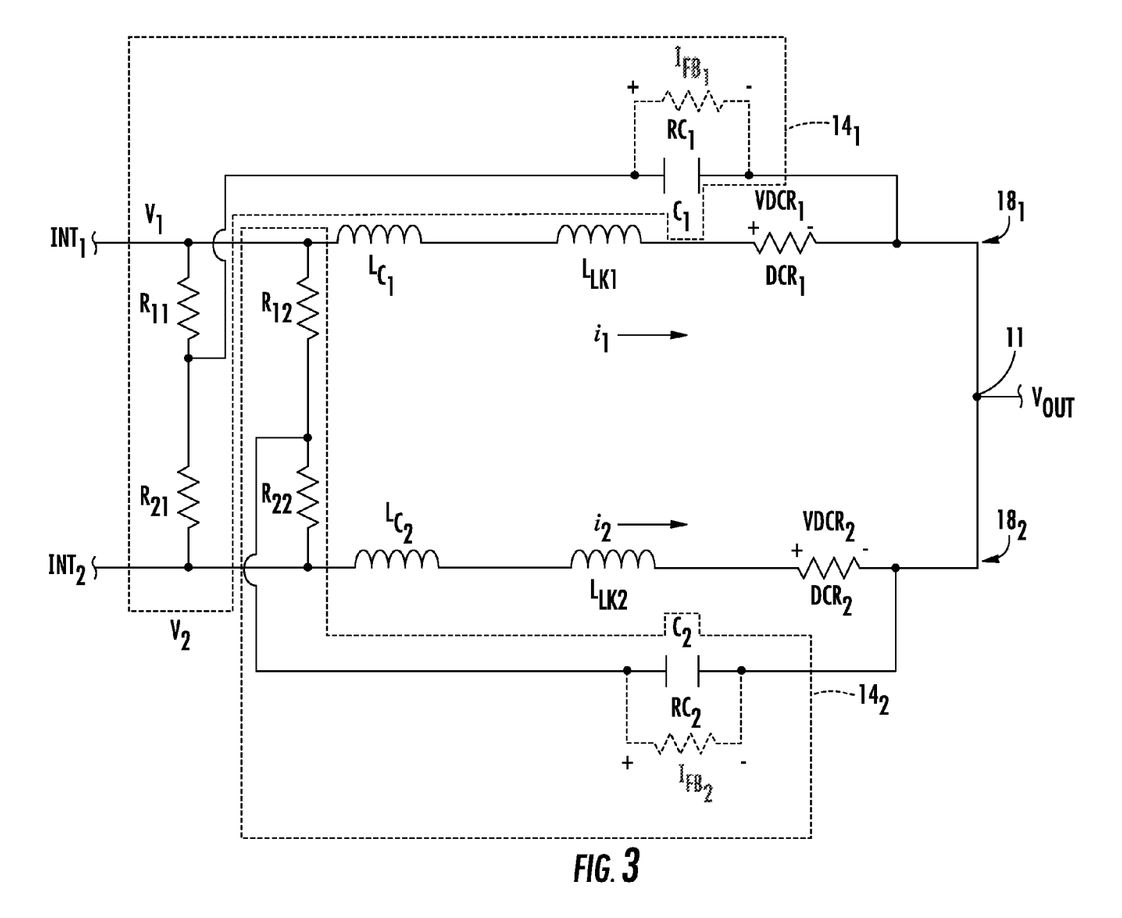
FIG. 3 is a schematic diagram of a two-phase version of the power-supply portion of FIG. 2.

FIG. 3 is a schematic diagram of a two-phase (n=2) version of the power-supply portion of FIG. 2.

Referring to FIG. 3, an embodiment of a technique for calculating values for $R_{11}$, $R_{12}$, $R_{21}$, $R_{22}$, $C_1$, and $RC_1$ (if present) is presented. To simplify the presentation, it is assumed that $R_{11}=R_{22}=R_1$, $R_{21}=R_{12}=R_2$, $L_{C1}=L_{C2}=L_C$, $L_{Llk1}=L_{lk2}=L_{lk}$, $DCR_1=DCR_2=DCR$, and $RC_1=RC_2=\infty$ (i.e., $RC_1$ and $RC_2$ are omitted) in equations (1)-(16) below. It is, however, understood that the disclosed embodiment may be extrapolated to a more general embodiment of FIGS. 2-3 for $R_{11} \neq R_{22}$, $R_{21} \neq R_{12}$, $L_{C1} \neq L_{C2}$, $L_{lk1} \neq L_{lk2}$, $DCR_1 \neq DCR_2$, $RC_1 \neq RC_2 \neq \infty$, and n>2.

Still referring to FIG. 3, the following equations are derived from the general relationship between the currents through and the voltages across reverse-coupled inductors-the windings $18_1$ and $18_2$ are reversed coupled when a positive current flowing through the winding $18_1$ into the node 11 induces a positive current in the winding $18_2$ also flowing into the node 11.

$$V_1 = s \cdot (L_{lk} + L_C) \cdot i_1 - s \cdot L_C \cdot i_2 + DCR \cdot i_1 \quad (1)$$

$$V_2 = s \cdot (L_{lk} + L_C) \cdot i_2 - s \cdot L_C \cdot i_1 + DCR \cdot i_2 \text{ and} \quad (2)$$

$$i_2 = \frac{V_2 + s \cdot L_C \cdot i_1}{s \cdot (L_{lk} + L_C) + DCR} \quad (3)$$

where $V_1$ and $V_2$ are the voltages at nodes $INT_1$ and $INT_2$, respectively.

From equations (1)-(3), one may derive the following equation for $i_1$:

$$i_1 = \frac{V_1 \cdot [s \cdot (L_{lk} + L_C) + DCR] + s \cdot L_C \cdot V_2}{[s(L_{lk} + L_C) + DCR]^2 - [s \cdot L_C]^2} \quad (4)$$

Furthermore, where $R_{11}=R_1$ and $R_{21}=R_2$ are the resistors coupled to the capacitor $C_1$, one may derive the following equation for the voltage $I_{FB1}$ across $C_1$:

$$I_{FB1} = \frac{\frac{R_1}{1+s\cdot R_1\cdot C_1}}{\frac{R_1}{1+s\cdot R_1\cdot C_1}+R_2}\cdot V_1 + \frac{\frac{R_2}{1+s\cdot R_2\cdot C_1}}{\frac{R_2}{1+s\cdot R_2\cdot C}+R_1}\cdot V_2 \quad (5)$$

Because the voltage $VDCR_1$ across $DCR_1$ equals $i_1\cdot DCR_1$, $VDCR_1$ has the same phase as $i_1$, and has an amplitude that is proportional (by a factor $DCR_1$) to the amplitude of $i_1$; as discussed above in conjunction with FIG. 1, these attributes are suitable for $I_{FB1}$.

Unfortunately, $DCR_1$ is a modeled component, and one does not have physical access to the voltage $VDCR_1$ across it.

But, one can set $I_{FB1} = VDCR_1 = i_1\cdot DCR_1$ according to the following equation, which is derived from equations (4) and (5):

$$\frac{R_1\cdot V_1 + R_2\cdot V_2}{R_1+R_2+s\cdot R_1\cdot R_2\cdot C_1} = \frac{V_1\cdot [s\cdot (L_{lk}+L_C)+DCR]+s\cdot L_C\cdot V_2}{[s(L_{lk}+L_C)+s\cdot L_C+DCR]\cdot [s\cdot L_{lk}+DCR]}\cdot DCR \quad (6)$$

From equation (6), one can derive the following two equations:

$$\frac{R_1\cdot V_1}{R_1+R_2+s\cdot R_1\cdot R_2\cdot C_1} = \frac{V_1\cdot [s\cdot (L_{lk}+L_C)+DCR]}{[s(L_{lk}+L_C)+s\cdot L_C+DCR]\cdot [s\cdot L_{lk}+DCR]}\cdot DCR \quad (7)$$

$$\frac{R_2\cdot V_2}{R_1+R_2+s\cdot R_1\cdot R_2\cdot C_1} = \frac{s\cdot L_C\cdot V_2}{[s(L_{lk}+L_C)+s\cdot L_C+DCR]\cdot [s\cdot L_{lk}+DCR]}\cdot DCR \quad (8)$$

Referring to FIG. 1, if one assumes that the controller 20 switches the transistors 22 and 24 at a relatively high frequency, e.g., 100 KHz or higher (this assumption applies in many applications of multiphase power supplies), then one may assume that $s(L_{lk}+L_c)$ and $sL_{lk}$ are much greater than DCR. Applying these assumptions, equations (7) and (8) respectively reduce to the following equations:

$$\frac{R_1\cdot \left(1+s\cdot \frac{L_{lk}}{DCR}\right)}{(R_1+R_2)\cdot \left(1+s\cdot \frac{R_1\cdot R_2}{R_1+R_2}\cdot C\right)} = \frac{L_{lk}+L_C}{L_{lk}+2L_C} \quad (9)$$

$$\frac{R_2\cdot \left(1+s\cdot \frac{L_{lk}}{DCR}\right)}{(R_1+R_2)\cdot \left(1+s\cdot \frac{R_1\cdot R_2}{R_1+R_2}\cdot C\right)} = \frac{L_C}{L_{lk}+2L_C} \quad (10)$$

From equations (9) and (10), one may derive the following design equations for the sensor circuit $14_1$ of FIG. 3:

$$\frac{R_1}{R_1+R_2} = \frac{L_{lk}+L_C}{L_{lk}+2L_C} \quad (11)$$

$$\frac{R_2}{R_1+R_2} = \frac{L_C}{L_{lk}+2L_C} \quad (12)$$

$$\frac{L_{lk}}{DCR} = \frac{R_1\cdot R_2}{R_1+R_2}\cdot C_1 \quad (13)$$

Therefore, by selecting the components $R_{11}=R_1$, $R_{21}=R_2$, and $C_1$ ($L_{C1}=L_C$, $L_{lk1}=L_{lk}$, and $DCR_1=DCR$ are assumed to be known quantities for purposes of this disclosure) of the sensor circuit $14_1$ such that they satisfy the design equations (11)-(13), the results are that $I_{FB1}\approx i_1\cdot DCR_1$, and therefore, that $I_{FB1}$ has approximately the same phase as $i_1$, and has an amplitude that is approximately proportional to (i.e., that has approximately the same amplitude profile as) the amplitude of $i_1$. Furthermore, because at least in some applications the design equation (12) may be redundant, one may design the sensor circuit $14_1$ by selection component values that satisfy only the equations (11) and (13).

Figure 4A:
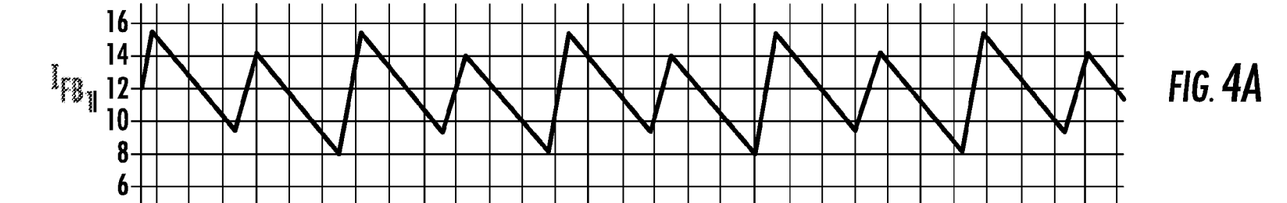
FIGS. 4A and 4C are timing diagrams of sense signals that are generated by the sensor circuits of FIG. 3.
Figure 4B:
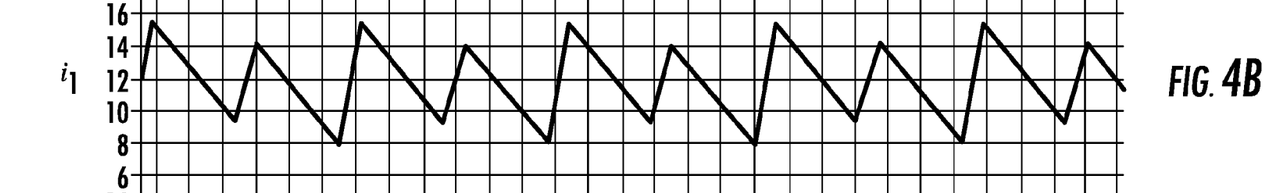
FIGS. 4B and 4D are timing diagrams of the phase currents flowing through the windings of FIG. 3.
Figure 4C:
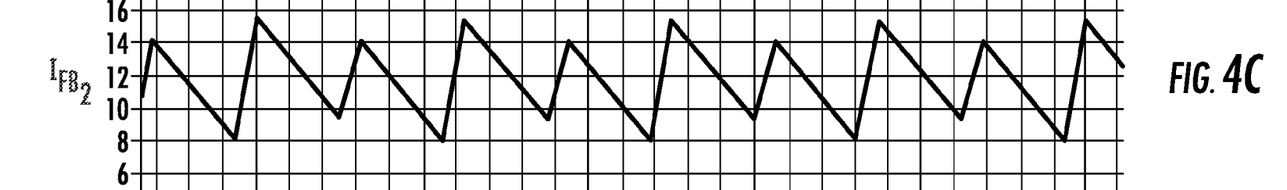
Figure 4D:
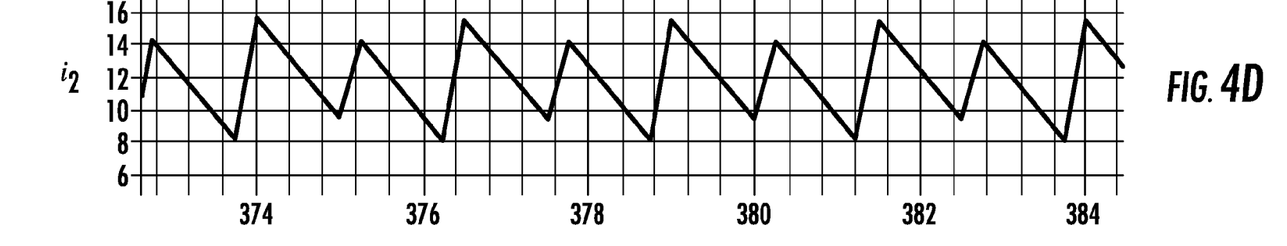

FIGS. 4A-4D are respective timing diagrams of $I_{FB1}$, $i_1$, $I_{FB2}$, and $i_2$ of FIG. 3 for a two phase embodiment of the power-supply 10 of FIG. 1 for the following component values, which satisfy the design equations (11)-(13): $L_{lk1}=L_{lk2}=200$ nanohenries (nH), $L_{c1}=L_{c2}=500$ nH, $DCR_1=DCR_2=2$ milliohms (mΩ), $C_1=_2=0.01$ microfarads (μF), $R_{11}=R_{22}=17$ kiloohms (KΩ), and $R_{12}=R_{21}=24$ KΩ. Although $I_{FB1}$ and $I_{FB2}$ are voltages, the timing diagrams of FIGS. 4A and 4C are in units of Amperes (current) because $I_{FB1}$ and $I_{FB2}$ respectively represent the phase currents $i_1$ and $i_2$. For purposes of plotting only, $I_{FB1}$ and $I_{FB2}$ have been normalized by setting $DCR_1=DCR_2=1$ such that $I_{FB1}$ has the same amplitude profile and phase as $i_1$, and $I_{FB2}$ has the same amplitude profile and phase as $i_2$. Of course the power-supply controller 20 (FIG. 1) may adjust the amplitude of the $I_{FB1}$ and $I_{FB2}$ within the controller by a scale factor other than unity.

Referring again to FIGS. 1-4D, alternate embodiments of the disclosed technique for designing the sensor circuits $14_1$-$14_n$ are contemplated. For example, equations (1)-(13) may be extrapolated for the design of the power supply 10 having more than n=2 magnetically coupled phases $12_1$ and $12_2$ (i.e., for n>2). But the equations (1)-(13) may also be suitable for an embodiment of the power supply 10 having only pairs of magnetically coupled phases 12, e.g., phase $12_1$ coupled to phase $12_2$ only, phase $12_3$ coupled to phase $12_4$ only, and so on. Furthermore, one may modify the equations (1)-(13) to cover an embodiment of the power supply 10 where one or more components of the sensor circuit 14 and winding 18 of one phase 12 have different values than the corresponding one or more components of the sensor circuit 14 and winding 8 of another phase 12. Moreover, one may modify equations (9)-(13) so that they are not simplified based on the assumption that the controller 20 switches the phases 12 at a relatively high frequency. In addition, although the sensor circuits 14 are described as being useful to sense the currents through magnetically coupled phases 12, one may use the sensor circuits 14 or similar sensor circuits to sense the currents through magnetically uncoupled phases. Furthermore, the disclosed technique, or a modified version thereof, may be suitable for designing the sensor circuits of a multiphase power supply other than a buck converter. Moreover, although an embodiment of a technique for designing the sensor circuit $14_1$ is disclosed the same or a similar embodiment may be used to design the sensor circuit $14_2$. In addition, although the sensor circuits $14_1$-$14_n$ are disclosed as each being coupled to the intermediate nodes $INT_1$-$INT_2$, the sensor circuits may be coupled to other non-output nodes of phases $12_1$-$12_n$. The output node of a phase 12 is the node where all of the phases are coupled together, for example the node 11 in FIG. 2 where the filter inductor 28 is omitted.

Referring again to FIG. 3, one may wish to include the optional resistor $RC_1$ in the sensor circuit $14_1$ to scale the voltage $I_{FB1}$ such that $K_1\cdot I_{FB1}=i_1\cdot DCR_1$, and thus $I_{FB1}=(i_1\cdot DCR_1)/K_1$, where $K_1\le 1$ ($K_1=1$ when $RC_1$ is omitted). When $RC_1$ is present and n=n, then the design equations (11) and (13) may be respectively modified into the following equations, assuming that the values of $L_C$, $L_{lk}$, and DCR are the same for each winding $18_1$-$18_n$ (because the design equation (12) may redundant as discussed above, the equation into which one may modify equation (12) when $RC_1$ is present is omitted for brevity):

$$\frac{R_{11}}{R_{11} + R_{21} + \ldots + R_{n1}} = \frac{L_{lk} + L_C}{L_{lk} + nL_C} \quad (14)$$

$$\frac{L_{lk}}{DCR} = \frac{R_{11} \cdot R_{21} \cdot \ldots \cdot R_{n1} \cdot RC_1}{R_{11} + R_{21} + \ldots + R_{n1}} \cdot C_1 \quad (15)$$

And $K_1$ is given by the following equation:

$$K_1 = \frac{(R_{11} + R_{21} + \ldots + R_{n1}) \cdot RC_1}{(R_{11} + R_{21} + \ldots + R_{n1}) \cdot RC_1 + R_{11} \cdot R_{21} \cdot \ldots \cdot R_{n1}} \quad (16)$$

The modified design equations for the components of the sensor circuits $14_2$-$14_n$ and the equations for the scale factors $K_2$-$K_n$ may be respectively similar to equations (14)-(16). Furthermore, equations (14)-(16) may be modified where $L_C$, $L_{lk}$, and DCR are not the same for each winding $18_1$-$18_n$.

Figure 5:
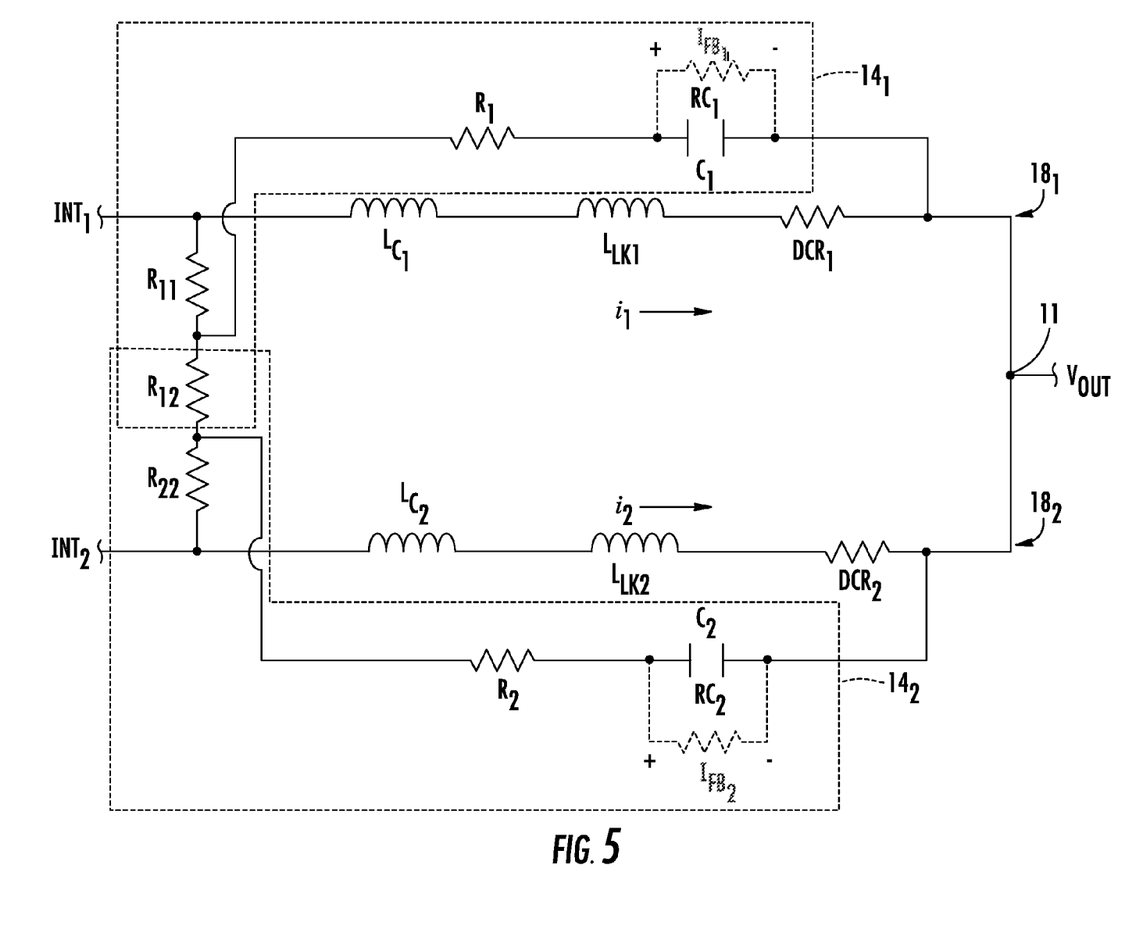
FIG. 5 is a schematic diagram of a portion of a two phase version of the powers supply of FIG. 1 including the phase-path windings and another embodiment of the sensor circuits of FIG. 1.

FIG. 5 is schematic diagram of a portion of a two-phase (n=2) version of the power supply 10 of FIG. 1 including the windings $18_1$ and $18_2$ (which we magnetically coupled) and another embodiment of the sensor circuits $14_1$ and $14_2$. For purposes of discussion, it is assumed that the filter inductor 28 is omitted from the power supply 10. For brevity, only the sensor circuit $14_1$ is discussed, it being understood that the other sensor circuit $14_2$ is similar except for possibly the values of the components that compose the sensor circuit $14_2$.

The sensor $14_1$ includes a capacitor $C_1$ across which the sense signal $I_{FB1}$ (here a voltage signal) is generated, an optional scaling resistor $RC_1$ across the capacitor $C_1$, a resistor $R_1$ coupled to the capacitor $C_1$, and a resistor $R_{11}$, which is coupled between the phase intermediate node $INT_1$ and the resistor $R_1$. The resistors $R_{11}$ and $R_1$ couple to $C_1$ a signal (a current in this embodiment) that represents the portion of the phase current $i_1$ that the switching transistors $22_1$ and $24_1$ (FIG. 1) cause to flow through the winding $18_1$.

Similarly, the sensor circuit $14_2$ includes a capacitor $C_2$ across which the sense signal $I_{FB2}$ (here a voltage signal) is generated, an optional scaling resistor $RC_2$ across the capacitor $C_2$, a resistor $R_2$ coupled to the capacitor $C_2$, and a resistor $R_{22}$, which is coupled between the phase intermediate node $INT_2$ and the resistor $R_2$. The resistors $R_{22}$ and $R_2$ couple to $C_2$ a signal (a current in this embodiment) that represents the portion of the phase current $i_2$ that the switching transistors $22_2$ and $24_2$ (FIG. 1) cause to flow through the winding $18_2$.

The sensor circuits $14_1$ and $14_2$ also "share" a resistor $R_{12}$, which is coupled between the resistors $R_1$ and $R_2$ and also between the resistors $R_{11}$ and $R_{22}$. The resistors $R_{22}$, $R_{12}$, and $R_1$ couple to $C_1$ a signal (a current in this embodiment) that represents the portion of the phase current $i_1$ that the phase current $i_2$ magnetically induces in the winding $18_1$. That is, the resistors $R_{22}$, $R_{12}$, and $R_1$ couple to $C_1$ a current that is proportional to the portion of $i_1$ that $i_2$ magnetically induces in the winding $18_1$. Similarly, the resistors $R_{11}$, $R_{12}$, and $R_2$ couple to $C_2$ a signal (a current in this embodiment) that represents the portion of the phase current $i_2$ that the phase current $i_1$ magnetically induces in the winding $18_2$.

One may extrapolate the sensor circuit $14_1$ for use in the power supply 10 (FIG. 1) where n>2 by including in the sensor circuit a respective resistive network between the node $INT_1$ and all the other nodes $INT_2$-$INT_n$, where each resistive network may be similar to the network of resistors $R_{11}$, $R_{12}$, and $R_{22}$, except possibly for the values of these resistors. The resistor $R_1$ would be coupled to the respective nodes of these resistive networks corresponding the node between $R_{11}$ and $R_{22}$ in FIG. 5. And the resistors corresponding to the resistor $R_2$ in FIG. 5 would be respectively coupled to the nodes corresponding to the node between $R_{12}$ and $R_{22}$ in FIG. 5.

One may extrapolate the sensor circuit $14_2$ for use in the power supply 10 (FIG. 1) where n>2 in a similar manner, and the sensor circuits $14_3$-$14_n$ may each be similar to the sensor circuits $14_1$ and $14_2$, except possibly for the values of the resistors.

Still referring to FIG. 5, in an embodiment one may derive design equations for the sensor circuit $14_1$ in a manner similar to that presented above in conjunction with FIG. 3. Assuming an embodiment of the sensor circuit $14_1$ where $L_{c1}=L_{c2}=L_c$, $L_{lk1}=L_{lk2}=L_{lk}$, $DCR_1=DCR_2=DCR$, $R_{11}=R_{22}=R_A$, and $R_{12}=R_B$, the design equations for such an embodiment are as follows:

$$\frac{R_A}{R_A + R_B} = \frac{L_C}{L_{lk} + 2L_C} \quad (17)$$

$$\frac{L_{lk}}{DCR} = R_1 \cdot C \quad (18)$$

$$K_1 = \frac{RC_1}{R_1 + RC_1} \quad (19)$$

Referring again to FIGS. 1 and 5, alternate embodiments of the disclosed technique for designing the sensor circuits $14_1$-$14_n$ of FIG. 5 are contemplated. For example, equations (17)-(19) may be modified for the design of the power supply 10 having more than n=2 magnetically coupled phases $12_1$ and $12_2$ (i.e., for n>2). But the equations (17)-(19) may also be suitable for an embodiment of the power supply 10 having only pairs of magnetically coupled phases 12, e.g., phase $12_1$ coupled to phase $12_2$ only, phase $12_3$ coupled to phase $12_4$ only, and so on. Furthermore, one may modify the equations (17)-(19) to cover an embodiment of the power supply 10 where one or more components of the sensor circuit 14 and winding 18 of one phase 12 have different values than the corresponding one or more components of the sensor circuit 14 and winding 18 of another phase 12. Moreover, one may modify equations (17)-(19) so that they are not simplified based on the assumption that the controller 20 switches the phases 12 at a relatively high frequency. In addition, although the sensor circuits 14 of FIG. 5 are described as being useful to sense the currents through magnetically coupled phases 12, one may use the sensor circuits 14 or similar sensor circuits to sense the currents through magnetically uncoupled phases. Furthermore, the disclosed technique, or a modified version thereof, may be suitable for designing the sensor circuits of a multiphase power supply other than a buck converter. Moreover, although an embodiment of a technique for designing the sensor circuit $14_1$ is disclosed, the same or a similar embodiment may be used to design the sensor circuit 142. In addition, although the sensor circuits $14_1$-$14_2$ are disclosed as each being coupled to the intermediate nodes $INT_1$-$INT_2$, the sensor circuits $14_1$-$14_2$ (and $14_3$-$14_n$ of present) may be coupled to other non-output nodes of the phases $12_1$-$12_2$ (and $12_3$-$12_n$ of present).

Figure 6:
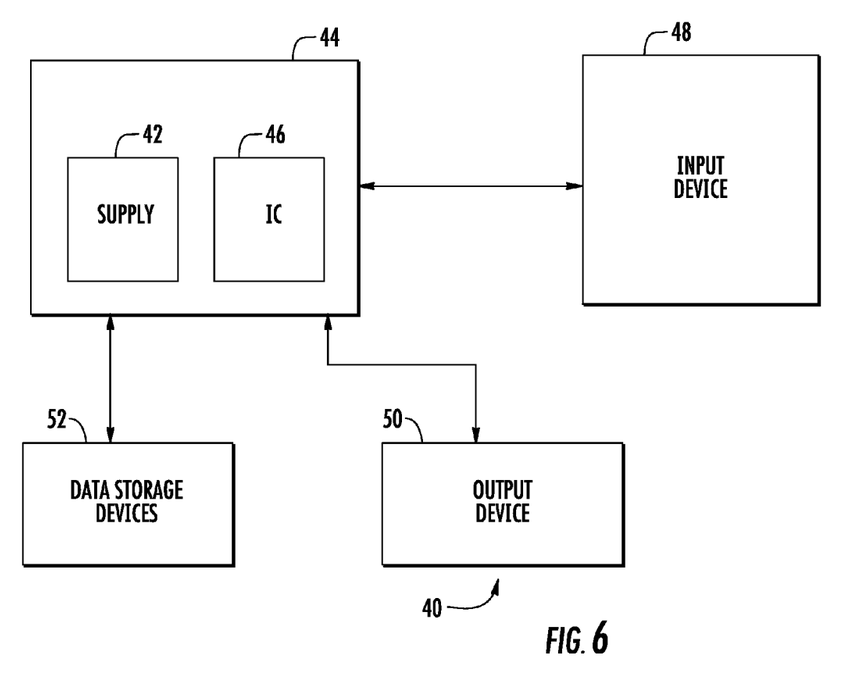
FIG. 6 is a block diagram of an embodiment of a computer system having a power supply that includes sensor circuits that are the same as or similar to one or more of the embodiments discussed above in conjunction with FIGS. 2-3 and 5.

FIG. 6 is a block diagram of an embodiment of a system 40 (here a computer system), which may incorporate a multiphase power supply 42 (such as the multiphase power supply 10 of FIG. 1) that includes one or more phase-current sensor circuits that are the same as or that are similar to embodiments of one or more of the current sensor circuits 14 of FIGS. 2, 3, and 5.

The system 40 includes computer circuitry 44 for performing computer functions, such as executing software to perform desired calculations and tasks. The circuitry 44 typically includes a controller, processor, or one or more other integrated circuits (ICs) 46, and the power supply 42, which provides power to the IC(s) 46—these IC(s) compose(s) the load of the power supply. The power supply 42, or a portion thereof, may be disposed on the same IC die as one or more of the ICs 46, or may be disposed on a different IC die.

One or more input devices 48, such as a keyboard or a mouse, are coupled to the computer circuitry 44 and allow an operator (not shown) to manually input data thereto.

One or more output devices 100 are coupled to the computer circuitry 44 to provide to the operator data generated by the computer circuitry. Examples of such output devices 50 include a printer and a video display unit.

One or more data-storage devices 52 are coupled to the computer circuitry 44 to store data on or retrieve data from external storage media (not shown). Examples of the storage devices 52 and the corresponding storage media include drives that accept hard and floppy disks, tape cassettes, compact disk read-only memories (CD-ROMs), and digital-versatile disks (DVDs).

From the foregoing it will be appreciated that, although specific embodiments have been described herein for purposes of illustration, various modifications may be made without deviating from the spirit and scope of this disclosure. Furthermore, where an alternative is disclosed for a particular embodiment, this alternative may also apply to other embodiments even if not specifically stated.

What is claimed is:

1. A power supply, comprising:
   a supply output node configured to carry a regulated output voltage;
   phase paths each having a respective phase-path output node coupled to the supply output node, each having a respective phase-path non-output node, and each configured to carry a respective phase current, at least two of the phase paths magnetically coupled to one another; and
   at least two sensor circuits each having a respective first sensor node coupled to the phase-path non-output nodes of the at least two phase paths and each configured to generate a respective sense signal that represents the phase current flowing through a respective one of the at least two phase paths.

2. The power supply of claim 1 wherein all of the phase paths are magnetically coupled to one another.

3. The power supply of claim 1 wherein:
   the phase paths each include a respective inductor coupled between the phase-path non-output node and the output node; and
   wherein the inductors of each of the at least two phase paths are magnetically coupled to one another.

4. The power supply of claim 1 wherein each of the at least two sensor circuits is configurable to generate as the respective sense signal a respective voltage that represents an amplitude and a phase of the phase current flowing through a respective one of the at least two phase paths.

5. The power supply of claim 1 wherein each of the at least two sensor circuits:
   includes a respective second sensor node coupled to the supply output node; and
   is configured to generate as the respective sense signal a respective voltage between the first and second sensor nodes.

6. The power supply of claim 1 wherein each of the at least two sensor circuits includes:
   a respective second sensor node coupled to the supply output node; and
   a respective component coupled between the first and second sensor nodes.

7. The power supply of claim 1 wherein each of the at least two sensor circuits includes:
   a respective second sensor node coupled to the supply output node; and
   a respective capacitor coupled between the first and second sensor nodes.

8. The power supply of claim 1 wherein each of the at least two sensor circuits includes:
   a respective second sensor node coupled to the supply output node; and
   a respective capacitor and a respective resistor coupled in parallel between the first and second sensor nodes.

9. The power supply of claim 1 wherein each of the at least two sensor circuits includes:
   a respective second sensor node coupled to the supply output node;
   a respective first resistor coupled to the first sensor node;
   a respective capacitor and a respective second resistor coupled in parallel between the first resistor and the second sensor node; and
   respective third resistors each coupled between the first resistor and a phase-path non-output node of a respective one of the at least two phase paths.

10. The power supply of claim 1 wherein each of the at least two sensor circuits further includes components each coupled between the first sensor node and a phase-path non-output node of a respective one of the at least two phase paths.

11. The power supply of claim 1 wherein each of the at least two sensor circuits further includes respective resistors each coupled between the respective first sensor node and a phase-path non-output node of a respective one of the at least two phase paths.

12. The power supply of claim 1, further comprising resistors each coupled between respective pairs of the first sensor nodes of the at least two phase paths.

13. The power supply of claim 1 wherein at least one of the phase paths has a respective phase-path non-output node, has a respective phase-path output node coupled to the supply output node, and is configured to carry a respective phase current, the at least one phase path being magnetically uncoupled from the other phase paths.

14. The power supply of claim 1, further comprising:
   phase-path drivers each coupled to a phase-path non-output node of a respective one of the phase paths; and
   a controller coupled to the at least two sensor circuits and the phase-path drivers and configured to regulate the output voltage by controlling the phase-path drivers coupled to the at least two phase paths in response to the sense signals.

15. The power supply of claim 1, further comprising:
   phase-path drivers each coupled to a phase-path non-output node of a respective one of the phase paths; and
   a controller coupled to the supply output node, the at least two sensor circuits, and the phase-path drivers and configured to regulate the output voltage by controlling the phase-path drivers coupled to the at least two phase paths in response to the output voltage and the sense signals.

16. The power supply of claim 1, further comprising:
wherein each of the at least two sensor circuits includes a respective second sensor node; and
a filter coupled between the second sensor nodes of the at least two sensor circuits and the supply output node.

17. The power supply of claim 1, further comprising:
a reference node;
wherein each of the at least two sensor circuits includes a respective second sensor node;
a filter inductor coupled between the second sensor nodes of the at least two sensor circuits and the supply output node; and
a filter capacitor coupled between the reference node and the supply output node.

18. The power supply of claim 1, further comprising:
a reference node;
wherein each of the at least two sensor circuits includes a respective second sensor node coupled to the supply output node; and
a filter capacitor coupled between the reference node and the supply output node.

19. A system, comprising:
a power supply, including
    a supply output node configured to carry a regulated output voltage,
    phase paths each having a respective phase-path non-output node, each having a respective phase-path output node coupled to the supply output node, and each configured to carry a respective phase current, at least two of the phase paths magnetically coupled to one another,
    at least two sensor circuits each having a respective first sensor node coupled to the phase-path non-output nodes of the at least two phase paths and each configured to generate a respective sense signal that represents the phase current flowing through a respective one of the at least two phase paths,
    phase-path drivers each coupled to a phase-path non-output node of a respective one of the phase paths, and
    a power-supply controller coupled to the sensor circuits and the phase-path drivers and configurable to regulate the output voltage by controlling the phase-path drivers coupled to the at least two phase paths in response to the sense signals; and
a load coupled to the supply output node of the power supply.

20. The system of claim 19 wherein:
the power-supply controller is disposed on a first integrated-circuit die; and
the load is disposed on a second integrated-circuit die.

21. The system of claim 19 wherein:
the power-supply controller is disposed on an integrated-circuit die; and
the load is disposed on the same integrated-circuit die.

22. The system of claim 19 wherein the load includes an integrated circuit.

23. A method, comprising:
driving first and second power-supply phase paths with respective first and second driving signals to generate an output voltage;
generating in response to the first and second driving signals a first sense signal that represents a first phase-path current flowing through the first power-supply phase path; and
regulating the output voltage in response to the first sense signal.

24. The method of claim 23, further comprising magnetically coupling the first power-supply phase path to the second power-supply phase path.

25. The method of claim 23 wherein generating the first sense signal includes generating the first sense signal across a first impedance by coupling the first and second drive signals to the first impedance via respective second impedances.

26. The method of claim 23 wherein generating the first sense signal includes generating the first sense signal substantially equal to a first voltage across a capacitor by coupling the first and second drive signals to the capacitor via respective resistors.

27. The method of claim 23 wherein generating the first sense signal includes generating the first sense signal substantially equal to a first voltage across a parallel combination of a first resistor and a capacitor by coupling the first and second drive signals to the parallel combination via respective second resistors.

28. The method of claim 23, further comprising:
generating in response to the first and second driving signals a second sense signal that represents a second phase-path current flowing through the second power-supply phase path; and
wherein regulating the output voltage includes regulating the output voltage in response to the first and second sense signals.

29. The method of claim 23, further comprising:
driving a third power-supply phase path with a third driving signal to generate the output voltage;
wherein generating the first sense signal includes generating the first sense signal in response to the first, second, and third driving signals;
generating in response to the first, second, and third driving signals second and third sense signals that respectively represent second and third phase-path currents flowing through the second and third power-supply phase paths; and
regulating the output voltage in response to the first, second, and third sense signals.

* * * * *